Aug. 4, 1936.  C. HUNNICUTT  2,049,808
SEED GRADER
Filed May 6, 1935  2 Sheets-Sheet 1

Inventor
Charles Hunnicutt
By W. S. McHowell
Attorney

Aug. 4, 1936.         C. HUNNICUTT         2,049,808
SEED GRADER
Filed May 6, 1935         2 Sheets-Sheet 2
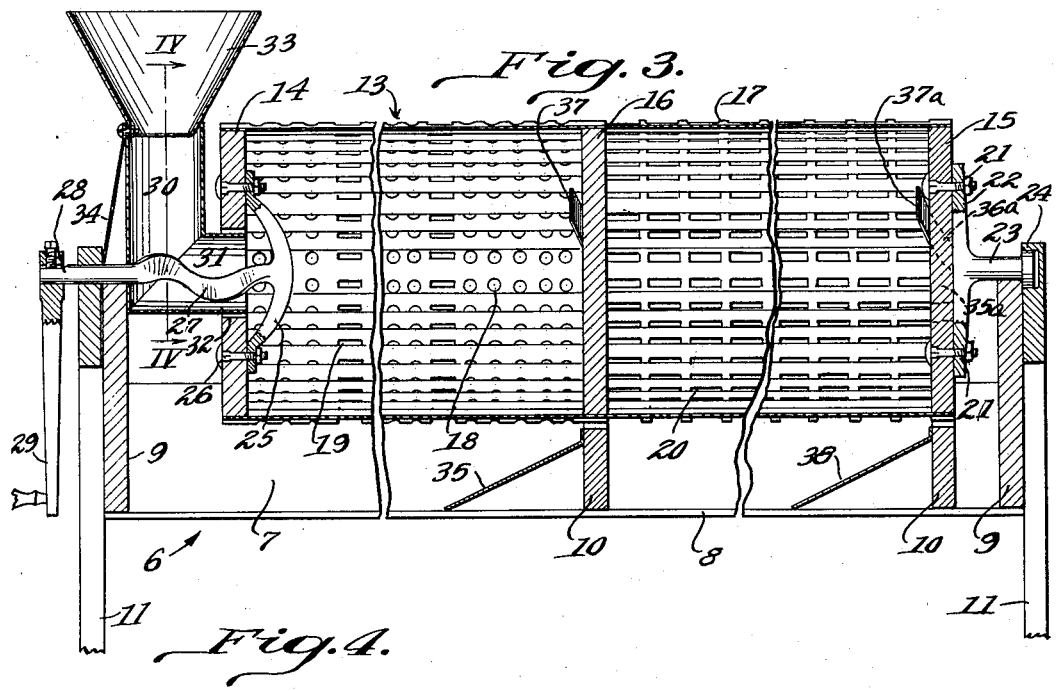
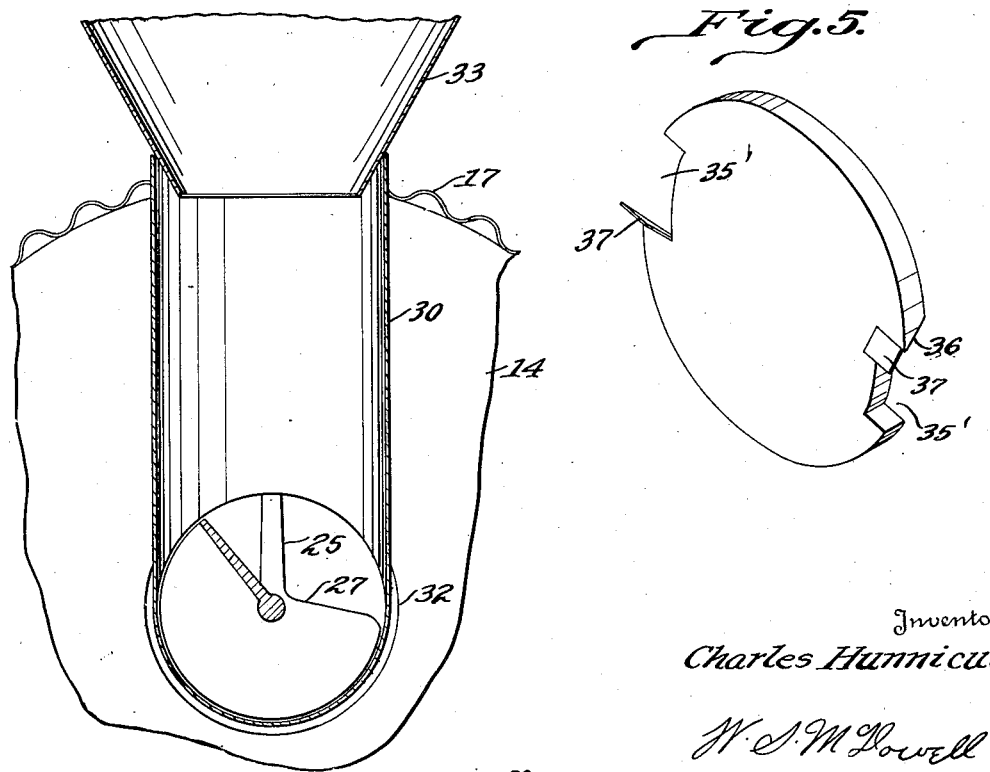
Inventor
Charles Hunnicutt
W. S. McDowell
By
Attorney Patented Aug. 4, 1936

2,049,808

UNITED STATES PATENT OFFICE 2,049,808

SEED GRADER

Charles Hunnicutt, Wilmington, Ohio

Application May 6, 1935, Serial No. 19,940

3 Claims. (Cl. 209—244)

This invention relates to improvements in rotary screens, and has particular reference to an improved screen for grading seed corn by which through a simple and effective means, seeds of undesired physical proportions may be removed from the desired seed and the latter segregated for subsequent planting purposes.

It is a primary object of the present invention to provide a rotary grading screen for handling seed corn which shall be of simple, economical and efficient construction and which in operation will separate seed promptly and effectively and in a manner devoid of mechanical complication.

My invention further comprehends the provision of a rotary corn grader of the single screen drum type in which the screen drum is mounted for rotation in a frame, the upper or inlet end of the screen drum being closed with a circular head having an opening in its center through which passes the lower arm of an elbow-shaped feed tube, and wherein a rotary feed auger formed in connection with a crank shaft operates within the lower horizontal arm of the feed tube to positively advance and regulate the inflow of corn into the interior of the screen drum, the screen drum being composed of two screening sections or portions, the upper or first portion of which being provided with relatively fine apertures and the lower or discharge portion thereof with relatively larger or coarser apertures, the arrangement being such that upon rotation of the screen drum, corn is automatically fed into the interior thereof, contacting with the first section thereof and permitting of the discharge of undersized grains of corn from the drum, the remaining corn being then transferred to the second or lower part of the drum wherein the apertures are of such size as to permit of the separate discharge of the larger or desired corn sizes, the extreme lower end of the screen drum being provided with an outlet for the separate and independent discharge of the unduly large or over-size seed corn.

In corn graders of this type, the rotation of the screen drum causes the seeds or kernels of corn to tumble about within the drum and to be subjected to considerable mechanical agitation, with the result that some of the corn passes to the second or lower section of the screen drum before it has been acted upon by the first or upper section. This is likewise true of the lower section, that is, some of the corn due to agitation passes out of the lower end of the screen drum before it has been fully acted upon by that section of the drum. To overcome this difficulty or undesirable condition, and at the same time to preserve mechanical simplicity, I provide a circular partition transversely within the screen drum at the junction of the two screen sections, said partition being provided with one or more openings in its outer peripheral portion in line with the inner surface of the screen drum. This partition prevents the corn from passing into the lower or second section of the screen drum, except in an orderly flow through the opening or openings provided in the circumferential portion of the partition, and to facilitate the flow of corn through the partition opening, one side or wall of said opening may be provided with a laterally inclined surface to deflect the kernels of corn into and through said opening and to provide for the positive passage of the corn from one section of the screen drum to the other.

Likewise, in accordance with the present invention, the discharge end of the screen drum is closed with a circular head having one or more openings at its outer boundary, whereby to prevent corn from passing out of the second section of the screen before it has been fully acted upon thereby, the comparatively small openings at the boundary of the discharge head providing for the orderly discharge of the kernels that are too large to pass through the apertures of the screen drum.

As in the case of the circular partition within the screen drum, the opening of the circular discharge head may have one of its walls provided with an inclined surface so that the positive discharge of the large sized kernels will be effected.

With this improved construction, it is a further object of the invention to provide a corn grader employing a shorter rotary screen drum than heretofore and to obtain more efficient segregation of kernel sizes, as well as to lessen the cost of the construction and decrease the weight.

A still further object resides in improved flexible means for effecting the support of the elbow-shaped feed tube in connection with the frame of the screen and its rotary drum.

For a further understanding of the invention, reference is to be had to the following description and the accompanying drawings, wherein:

Fig. 3 is a vertical longitudinal sectional view thereof;

Fig. 4 is a detail vertical sectional view on the line IV—IV of Fig. 3;

Fig. 5 is a detail perspective view of one of the screen partition heads.

Figure 1:
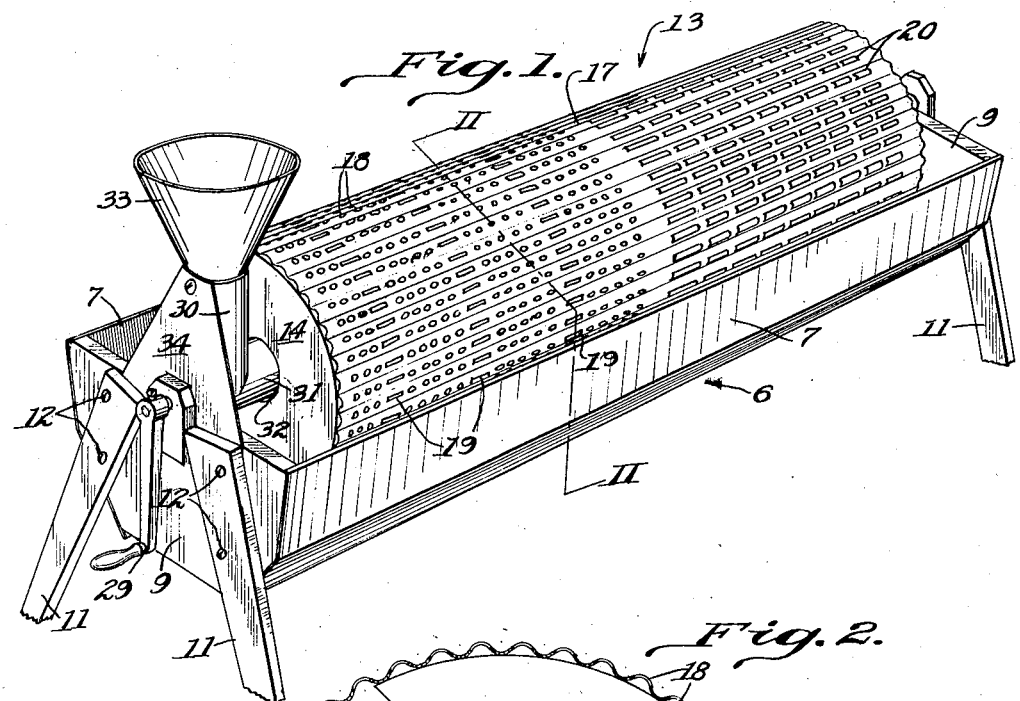
Fig. 1 is a perspective view of the improved rotary corn grading screen comprising the present invention.
Figure 2:
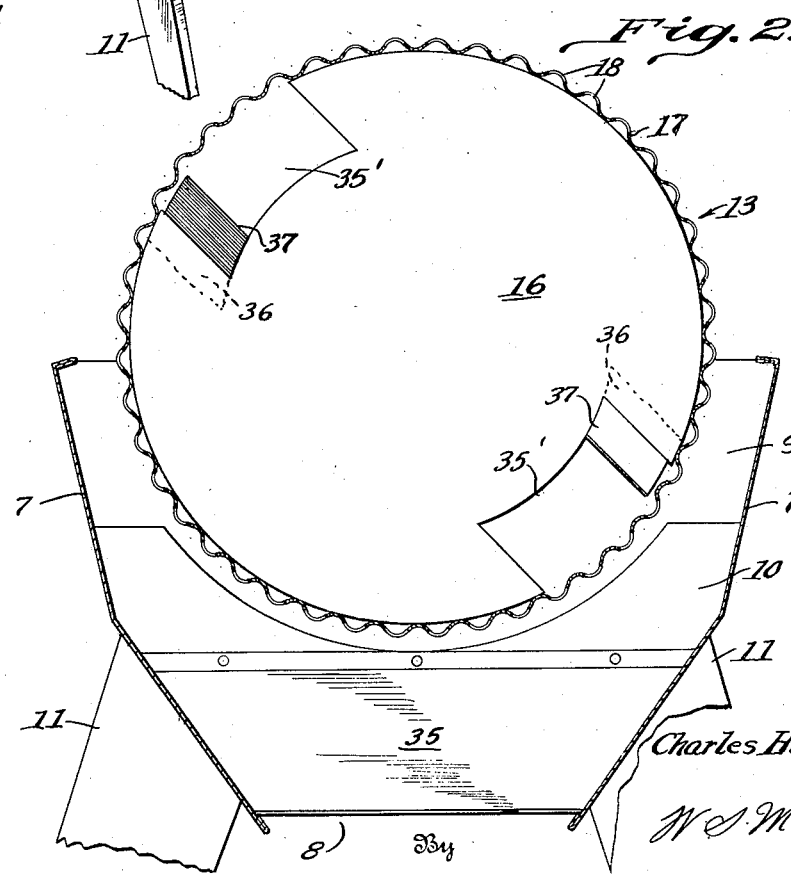
Fig. 2 is a transverse vertical sectional view taken through the screen on the plane indicated by the line II—II of Fig. 1.

In the preferred embodiment of my invention, as illustrated in the drawings, the frame 6 is of trough-shaped formation having downwardly inclined, longitudinally extending side walls 7 spaced at their lower ends to produce an elongated slot 8 and united transversely by vertical end walls 9 and intermediate vertical spacing walls 10. The end walls 9 are connected with downwardly diverging legs 11 which support the frame at a suitable horizontal level. Preferably, the upper ends of the legs 11 are detachably connected with the end walls 9 by means of removable screws or the like 12 for convenience and compactness in placing the screen within shipping containers.

Mounted for rotation about a slightly inclined longitudinal axis within and above the trough-shaped body of the frame is a screen drum 13. This drum includes circular inlet and outlet heads 14 and 15 respectively and an intermediate circular partition 16. Secured to the outer peripheral portions of the heads 14 and 15 and the partition 16 is a corrugated sheet metal cylinder or drum 17 having perforated walls. That portion of the cylinder or drum disposed in advance of the partition 16 is formed with a plurality of circular rows of relatively small round openings 18 with intervening rows 19 of relatively narrow slots, the openings 18 and the slots 19 being formed in what may be termed the upper or primary region of the drum. The lower or secondary region of said drum is formed between the partition 16 and the discharge head 15 and in this secondary region, the drum has its outer walls provided with a plurality of circularly arranged rows of slots 20 which are of larger size than the slots provided in the rows 19 of the primary section, the slots in the lower section being greater in length but less in width than the diameter of the round apertures in the upper section.

To effect the rotatable support of the screen drum, the head 15 has bolted or otherwise secured as at 21 to the outer axial portion thereof the web 22 of a stud shaft 23 which is rotatably received within a bearing 24 provided in connection with one of the vertical end walls 9 and its associated legs 11. The opposite or inlet end of the drum is likewise rotatably supported by means of a spider 25 which is bolted or otherwise secured as at 26 to the upper or inlet head 14. The spider has integrally formed therewith the blade of a feed auger 27, the outer end of which terminates in a shaft 28 which is journaled in connection with one of the end walls 9 and the upper portions of the supporting legs 11 attached thereto. The outer end of the shaft 28 is equipped with a handle or hand crank 29 by which the shaft 28 may be rotated. Since the shaft 28 is directly connected with the inlet head 14 of the drum through the auger 27 and the spider 25, it follows that the rotation of the crank 28 will result in similar rotation on the part of the screen drum.

In order to feed corn kernels into the screen drum, I employ an elbow-shaped feed tube 30, the horizontal portion 31 of which projects into an opening 32 provided in the inlet head 14, so that the drum may rotate independently of said feed tube. The upper vertical end of the feed tube terminates in a hopper 33 and the feed tube together with its hopper is supported by means of a flexible sheet metal plate 34 which projects upwardly from the frame 6. The flexibility of the plate 34 allows for variations in the alignment of the feed tube in relation to the auger 27, so that the latter will not stick or bind by reason of excessive frictional engagement with the walls of the horizontal portion 31 of the feed tube.

Corn kernels introduced into the feed tube are positively advanced into the primary region of the screen drum by the rotation of the shaft 28 and the auger 27. The small or undesirable undersized kernels pass through the circular openings 18 in the primary region of the drum. Also, kernels which are too large to pass through the openings 18 but which are so thin as to be undesired for seed purposes pass through the slots 19 and drop through the slot 8 in the bottom of the frame into a suitable receiving receptacle. An angular deflecting plate 35 is carried by one of the spacing walls 10 to direct the undesirable kernels away from the secondary region of the drum. To insure the retention of the kernels of corn within the primary region of the drum until all undesirable undersizes have been eliminated, I employ the partition 16. However, to transmit the larger sizes of kernels to the secondary region of the screen, the partition 16, as shown in Fig. 5, has its outer peripheral portion, in line with the inner surface of the drum, provided with one or more slots or openings 35'. Each of these slots may have one of its walls beveled or inclined with respect to the opposite or complemental wall in order that when the screen is rotated, the said inclined walls, as indicated at 36, will engage with the kernels and positively force the latter through the slots or openings 35' into the secondary region of the drum. If desired, the length of the inclined walls 36 may be increased beyond the thickness of the partition 16 by the employment of extension wings 37 arranged in the same planes as the walls 36. The kernels advanced to the secondary region of the drum, and which possess desired physical proportions suitable for seed purposes, pass through the slots 20 which are so proportioned as to permit of such passage and drop through the frame and its slot 8 into a suitable receptacle, not shown, in which the segregated kernels of desired size are collected, a deflector baffle 38 being connected with the lower end wall 10 to divert the kernels of desired size toward the underlying receptacle into which they are deposited by gravity.

Likewise, the end wall 15 at the discharge end of the drum is formed with one or more openings 35a which may include beveled or inclined walls and/or extension walls 36a and 37a in conformity with the construction of the partition wall 16. Through the slots or openings 35a, over-sized kernels of corn are passed for discharge from the screen and are delivered by gravity to the third underlying receptacle.

In view of the foregoing, it will be seen that the present invention provides a simple and highly efficient rotary screen for corn grading purposes which has the advantage of being light in weight, simple and easy to operate and economical to manufacture and purchase. The parts of the screen may be readily disassembled for shipping purposes in order to be compactly placed within a shipping container and the weight and size thereof is such that it will fall within the regulations of postal authorities. By the provision of the partition 16, I am enabled to use a single screen drum, avoiding specifically the multiplicity of drums heretofore employed in the construction of corn graders of this type and yet obtain equivalent, if not improved, operating efficiency.

What is claimed is:

1. In a rotary corn grader, a screen drum having spaced inlet and outlet heads, shafts secured to said heads and projecting axially therefrom, a supporting frame in which said shafts are journaled for rotation, the shaft connected with the inlet head of said drum being formed to include a feed auger, an elbow-shaped feed tube in the horizontal portion of which said auger is mounted for rotation, and a resilient support for said feed tube secured at one end to said frame structure and at the other end to said feed tube whereby the free end of said tube is free to oscillate.

2. In a rotary corn grader, a screen drum having spaced inlet and outlet heads, said inlet head being formed with a central opening, shafts secured to said heads and projecting axially therefrom, a supporting frame in which said shafts are journaled for rotation, the shaft connected with the inlet head of said drum being formed to include a feed auger, an elbow-shaped feed tube having the free end of the horizontal portion positioned within the central opening of said inlet head, and a flexible support for said feed tube secured at one end to said frame structure and to the vertical portion of said feed tube at the other end whereby the free end of said tube is free to oscillate.

3. In a rotary corn grader, a screen drum having spaced inlet and outlet heads, said inlet head being formed with a central opening, shafts secured to said heads and projecting axially therefrom, a supporting frame in which said shafts are journaled for rotation, the shaft connected with the inlet head being formed to include a feed auger, an elbow-shaped feed tube, the horizontal portion of which surrounds said auger and is received within the central opening of said inlet head, and a flexible supporting plate for said feed tube secured at one end to said frame structure and to the vertical portion of the said feed tube at the other end.

CHARLES HUNNICUTT.